(12) United States Patent
Farr

(10) Patent No.: US 10,016,847 B2
(45) Date of Patent: Jul. 10, 2018

(54) METHOD AND DEVICE FOR CUTTING WOUND HOSES

(71) Applicant: Witzenmann GmbH, Pforzheim (DE)

(72) Inventor: Matthias Farr, Friolzheim (DE)

(73) Assignee: Witzenmann GmbH, Pforzheim (DE)

( * ) Notice: Subject to any disclaimer, the term of this patent is extended or adjusted under 35 U.S.C. 154(b) by 688 days.

(21) Appl. No.: 14/293,323

(22) Filed: Jun. 2, 2014

(65) Prior Publication Data

US 2014/0352833 A1 Dec. 4, 2014

(30) Foreign Application Priority Data

Jun. 3, 2013 (DE) .................. 10 2013 105 678

(51) Int. Cl.
| | |
|---|---|
| *B23K 9/10* | (2006.01) |
| *B23K 11/24* | (2006.01) |
| *B23K 9/06* | (2006.01) |
| *B23K 11/26* | (2006.01) |
| *B23K 31/02* | (2006.01) |
| *H05B 6/62* | (2006.01) |
| *H05B 6/46* | (2006.01) |
| *H05B 6/60* | (2006.01) |
| *H05B 6/54* | (2006.01) |
| *B23K 28/02* | (2014.01) |
| *B23K 11/00* | (2006.01) |
| *B23K 26/38* | (2014.01) |
| *F16L 11/08* | (2006.01) |
| *B23K 7/00* | (2006.01) |

(Continued)

(52) U.S. Cl.
CPC ............ *B23K 28/02* (2013.01); *B21C 37/122* (2013.01); *B21C 37/127* (2013.01); *B23K 7/006* (2013.01); *B23K 11/002* (2013.01); *B23K 11/26* (2013.01); *B23K 26/38* (2013.01); *F16L 11/08* (2013.01); *F16L 11/16* (2013.01); *B23K 2201/06* (2013.01)

(58) Field of Classification Search
None
See application file for complete search history.

(56) References Cited

U.S. PATENT DOCUMENTS

| | | | | |
|---|---|---|---|---|
| 2,396,216 A | * | 3/1946 | Vang .................... | B23K 11/084 138/144 |
| 2,481,096 A | * | 9/1949 | Fentress ............ | B23K 11/3081 219/86.25 |

(Continued)

FOREIGN PATENT DOCUMENTS

DE 102012214044 5/2014

*Primary Examiner* — David Angwin
*Assistant Examiner* — Gyounghyun Bae
(74) *Attorney, Agent, or Firm* — Volpe and Koenig, P.C.

(57) ABSTRACT

A method for cutting a wound hose (1), made from mutually engaging windings (11, 12, 13, 14) of a metallic tape (2), with the wound hose (1) being welded in a predetermined axial area (10) and then cut within the area (10) essentially in a plane (6) extending radially, with the wound hose (1) being axially compressed in the predetermined area prior to welding such that in the area (10) a mutual contacting of the windings (11, 12, 13, 14) occurs. The welding is performed along a predetermined number of windings (11-14) in the area (10), and the welding energy required for welding the windings is introduced via the area of the winding hose into it. Additionally, an accordingly produced wound hose (1) is provided and a device suitable for its production.

13 Claims, 2 Drawing Sheets

(51) Int. Cl.
  *F16L 11/16* (2006.01)
  *B21C 37/12* (2006.01)
  *B23K 101/06* (2006.01)

(56) References Cited

U.S. PATENT DOCUMENTS

| | | | | |
|---|---|---|---|---|
| 3,073,944 | A * | 1/1963 | Yuter | B21C 37/126 |
| | | | | 219/62 |
| 3,269,005 | A * | 8/1966 | Smith | B21C 37/124 |
| | | | | 219/62 |
| 3,657,809 | A * | 4/1972 | Lehnert | B21C 37/08 |
| | | | | 174/102 R |
| 3,829,602 | A * | 8/1974 | Ishikawa | H01B 7/22 |
| | | | | 138/155 |
| 3,845,645 | A * | 11/1974 | Gebauer | B21C 37/128 |
| | | | | 219/62 |
| 4,071,834 | A * | 1/1978 | Comte | G02B 6/4458 |
| | | | | 138/122 |
| 4,112,566 | A * | 9/1978 | DuBosque, Jr. | B21D 53/08 |
| | | | | 165/171 |
| 4,113,286 | A * | 9/1978 | Kennedy, Jr. | F16L 3/127 |
| | | | | 248/62 |
| 4,197,728 | A * | 4/1980 | McGowen | B21C 37/121 |
| | | | | 138/135 |
| 4,341,440 | A * | 7/1982 | Trezeguet | G02B 6/4416 |
| | | | | 174/109 |
| 4,570,055 | A * | 2/1986 | McMills | B29C 61/0625 |
| | | | | 156/380.2 |
| 5,117,094 | A * | 5/1992 | Jensen | B29C 61/0625 |
| | | | | 219/535 |
| 5,212,364 | A * | 5/1993 | Chen | B23K 9/095 |
| | | | | 219/130.21 |
| 5,226,596 | A * | 7/1993 | Okamura | B29C 45/2737 |
| | | | | 219/421 |
| 5,362,113 | A * | 11/1994 | Thomas | F16L 13/02 |
| | | | | 138/135 |
| 5,915,736 | A * | 6/1999 | Marik | F16L 41/08 |
| | | | | 138/121 |
| 6,062,270 | A * | 5/2000 | Hultberg | B21C 37/123 |
| | | | | 138/122 |
| 6,125,889 | A * | 10/2000 | Elsasser | F16L 27/11 |
| | | | | 138/118 |
| 6,338,365 | B1 * | 1/2002 | Odru | F16L 11/082 |
| | | | | 138/131 |
| 6,380,509 | B1 * | 4/2002 | Arlt | B23K 26/28 |
| | | | | 219/121.63 |
| 7,111,770 | B2 * | 9/2006 | Kern | B23K 11/065 |
| | | | | 228/143 |
| 7,465,900 | B2 * | 12/2008 | Adler | H02J 5/005 |
| | | | | 219/60 R |
| 2007/0158312 | A1 * | 7/2007 | Wang | B23K 1/0004 |
| | | | | 219/59.1 |
| 2008/0012297 | A1 * | 1/2008 | Heil | F01N 13/1816 |
| | | | | 285/226 |
| 2010/0050724 | A1 * | 3/2010 | Stikeleather | F16L 11/24 |
| | | | | 72/135 |
| 2011/0174047 | A1 * | 7/2011 | Freeth | B21C 37/122 |
| | | | | 72/368 |
| 2012/0103051 | A1 * | 5/2012 | Kim | B21C 37/121 |
| | | | | 72/342.1 |
| 2012/0264596 | A1 * | 10/2012 | Koga | C04B 28/26 |
| | | | | 502/179 |
| 2013/0092675 | A1 * | 4/2013 | Hirata | C21D 1/40 |
| | | | | 219/162 |
| 2013/0233433 | A1 * | 9/2013 | Hof | B21C 37/123 |
| | | | | 138/121 |
| 2013/0240070 | A1 * | 9/2013 | Swarny | F16L 9/165 |
| | | | | 137/590 |
| 2015/0040372 | A1 * | 2/2015 | Suzuki | F16L 9/02 |
| | | | | 29/516 |

* cited by examiner

METHOD AND DEVICE FOR CUTTING WOUND HOSES

INCORPORATION BY REFERENCE

The following documents are incorporated herein by reference as if fully set forth: German Patent Application No. 102013105678.4, filed Jun. 3, 2013.

BACKGROUND

The invention relates to a method and a device for cutting and/or cutting to length wound hoses. Additionally the invention relates to an appropriately produced wound hose.

Such metal hoses are called wound hoses, which are formed from windings of a metallic tape, with here the windings being connected to each other relatively loosely in a form-fitting fashion. Typical forms of the connection are hooked profiles (so-called LIH-liner) and folded profiles (agraffe-profile, so-called LIS-liner).

Wound hoses with a hooked profile are characterized in a particularly high flexibility. Wound hoses with folded profiles are relatively stiff in their entirety. Due to the high flexibility, particularly wound hoses with hooked profiles cannot easily be welded, because here no defined welded geometry develops.

A particularly preferred application of the above-mentioned wound hoses is conducting the gas of the exhaust system in passenger vehicles and utility vehicles. Additional applications are e.g., protective hoses for fiber optics, telephone lines, lines for measuring devices or alarm systems.

A particular problem is given in wound hoses in that they can unravel after being cut to length. Then they cannot be assembled any more or only with increased expense, which is undesired in production.

According to prior art, the above-mentioned wound hoses are sawed, e.g., by a melting saw, and then the loose end is fixed via a manually placed welding spot. This is labor extensive and accordingly expensive and thus less suitable for serial production. Additionally, particularly in the application of wound hoses in exhaust systems, the absence of particles is desired, which however can develop when a wound hose is sawed. Such particles or chips can destroy filters or other components arranged downstream, particularly components for exhaust treatment. Accordingly, increasingly laser cutting methods are used.

For this purpose, three axially off-set laser beams are used, guided circumferentially about the hose. A first and a second beam each place a circumferential seam in order to fix the material of the wound hose, with the two seams being arranged axially off-set.

Subsequently, via a third laser beam, cutting of the wound hose occurs between these two seams. Here, it has proven disadvantageous that the two seams are embodied relatively undefined on wound hoses, because a wound hose, due to its general design, as described above, shows only relatively little material and a relatively large clear space located therebetween. Here, the risk is given that during the attempt of forming a laser seam the wound hose is cut rather than fixed.

Additionally, in the above-mentioned method relatively large tolerances develop, due to the inherent mobility of the wound hose. In the past, this problem has resulted in cases, in which during the actual cutting process the third laser beam even damaged the previously generated seams themselves. Then, once more an unraveling of the wound hose occurs, at least aggravating any assembly.

German patent application 10 2012 214 044.1 discloses a generic method and/or a respective device, with here, in order to avoid the above-mentioned disadvantages, the wound hose is axially compressed in an area such that then a welding in this area can occur along a predetermined number of windings of the wound hose.

SUMMARY

The objective of the invention is to provide an alternative method and a device for cutting wound hoses, which also allow a clean and reliable cutting of wound hoses.

This objective is attained with a method, a wound hose, and a device including one or more features of the invention. Advantageous further developments of the invention are defined below and in the claims.

A method according to the invention for cutting a wound hose, which comprises windings of a metallic tape engaging each other, with the wound hose being welded together in a predetermined axial area and is then cut within said area essentially along a radially extending plane, with the winding hose being axially compressed in the predetermined area prior to the welding process such that in this area the windings come to contact each other, and the welding is performed along a predetermined number of windings in said area, and the welding energy required for the welded connection of the windings is introduced thereto through the area of the wound hose.

By initially, prior to cutting, compressing the wound hose in the area which is to be cut, and then welding it along the windings, clean cutting areas develop during the cutting process and any unraveling of the hose is securely prevented. Since the welding occurs along the windings (preferably along a groove or joint between the windings) and not perpendicular in reference to the axis of the wound hose, the groove or joint shows here a constantly small width, which increases the precision of the cutting to length.

The welding energy required is introduced according to the invention via the wound hose itself into the above-mentioned area and/or into the welding zone along the compressed windings, which can occur in various manners.

Preferably the welding of the wound hose occurs via a capacitor discharge-welding method, known per se. For this purpose, at least one capacitor is charged with electric energy and via suitable electrodes it is made to contact the wound hose in the above-mentioned area in an electrically conductive fashion. This way, the capacitor discharges rapidly via the wound hose and the formation of a welding seam occurs in the contact area between the windings. Due to the fact that in the above-mentioned area preferably a compression has occurred "to block", here a (repeatedly) circulating, spiral welding seam forms, comparable to the disclosure of DE 10 2012 214 044.1. In this context it may be provided that the electrodes used for the welding process, preferably annular ones, are additionally also used for the compression of the wound hose, preferably even after the melting of the metallic tape until the melt has cured again.

However, the invention is not limited to the above-mentioned capacitor discharge-welding method. Another further development of the method according to the invention provides that the welding is performed via a friction welding method, preferably using a friction welding method induced by ultrasound.

In this context it is essential that the welded connection, unlike the disclosure of the German patent application 10 2012 2014 004.1, is not performed with the use of a laser beam but rather the welding energy is introduced via the above-mentioned section and/or the area of the wound hose itself into the welding zone and/or welding zones.

Advantageously, the predetermined number of windings to be welded is greater than or equal to 2, preferably the predetermined number is precisely 2.

Another further development of the method according to the invention is characterized in that a width of the above-mentioned area, in which area the wound hose is compressed and welded along the windings, is greater than a width of the welding zone. This can be achieved for example by an appropriate design of the above-mentioned (annular) electrodes—or alternatively such that in addition to the above-mentioned electrodes and/or the ultrasonic transducers for generating the ultrasound additional equipment is used, which is exclusively intended to cooperate with the wound hose (in a force-fitting fashion) in order to compress it in the above-mentioned area prior to the welding process. The introduction of the welding energy (electric energy, ultrasound, or the like) then occurs exclusively in the already compressed area via the respective additional equipment.

It is further advantageous for the cutting of the wound hose, after the welding, to be performed with the use of a laser beam. Alternatively, in all cases a mechanical cutting device may be used instead of a laser beam, without here leaving the scope of the invention defined by the claims.

During the cutting process the wound hose can be moved in reference to the laser beam or the mechanic cutting device. Alternatively, the laser beam or the mechanic cutting device may also be moved in reference to the wound hose.

It is advantageous for the laser beam and/or the wound hose to be automatically positioned in reference to each other, particularly with the use of a camera or another optic device.

The wound hose can be clamped at two edges of the area in order for it to be compressed. Advantageously the clamping of the wound hose occurs with the same device used for introducing the required welding energy, particularly, as already mentioned, via the (annular) electrodes provided for the capacitor discharge-welding method.

The invention also relates to a device for cutting a wound hose, made from mutually engaging windings of a metallic tape, comprising: a first welding device, particularly electrodes for a capacitor discharge-welding method, which are embodied for welding a wound hose in a predetermined axial area along a predetermined number of windings, and a cutting device, which is embodied for cutting the wound hose within a predetermined area in an essentially radial plane, with furthermore a clamping device being provided, which is embodied for the axial compression of the wound hose in said predetermined area such that here the individual windings are made to contact each other.

Within the scope of a particularly advantageous further development of a device according to the invention it is provided that the first welding device and the clamping device are realized by a common design element, particularly by the above-mentioned electrodes for the capacitor discharge-welding. These electrodes may be fastened radially at the wound hose and then moved in the axial direction of the wound hose towards each other in order to axially compress the wound hose in the predetermined area, before the voltage required for the capacitor discharge-welding is applied to the electrodes.

According to a particularly advantageous further development of the device according to the invention it is respectively provided that the welding and clamping devices are embodied as electrodes for capacitor discharge-welding, preferably as annular electrodes distanced according to a width of the area, which respectively can be opened and closed and are mobile in reference to each other in order to accept the wound hose, axially compress it, and then weld it.

Further advantageously, additional means may be provided for clamping the wound hose at two ends, in order to compress it in the above-mentioned area. These additional means may be separated by their design from the means for introducing the actual welding energy. For example, when a method for the capacitor discharge-welding (also called capacitor pulse welding) is used via the above-mentioned additional means, first the wound hose is axially compressed in an area. Subsequently in the above-mentioned compressed section the charged capacitor means are connected in an electrically conductive fashion to the wound hose and/or the respective electrodes are made to contact the wound hose. Similarly, in the above-mentioned friction welding method it may be proceeded such that first in turn the wound hose is axially compressed via the above-mentioned additional means and then in this compressed area the wound hose is impinged with ultrasound energy via appropriately embodied separate ultrasonic transducers.

The invention provides the advantage that at the final product in a simple, automated fashion a perpendicular terminal cutting area is yielded in the sense of a high-quality cut, without here the risk developing that the wound hose unravels. Due to the possible automation, here the implementation of the present invention allows the realization of high production numbers with appropriately short time periods and low costs.

In general, laser-supported cutting methods are suitable for the cutting process as well as mechanical methods (e.g. sawing). The cutting via laser beams is advantageous, though, since here no residue of particles develops and the cutting area is clean over its entire length.

The method according to the invention can generally be used for all types of wound hoses, particularly for wound hoses with a hooked profile (LIH-liner) or for wound hoses with a folded profile (agraffe-profile; so-called US-liner).

BRIEF DESCRIPTION OF THE DRAWINGS

Additional features and advantages of the present invention are discernible from the following description of exemplary embodiments based on the drawing, here showing.

DETAILED DESCRIPTION OF THE PREFERRED EMBODIMENTS

Figure 1:
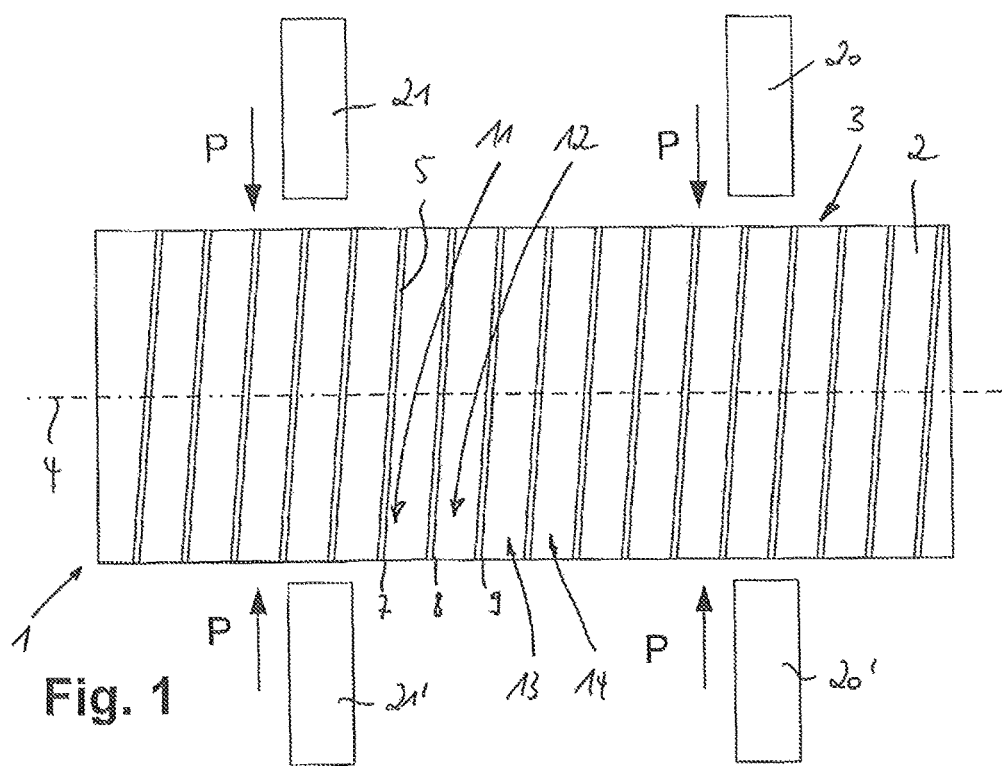
FIG. 1 shows a first cut with the application of the method according to the invention.
Figure 2:
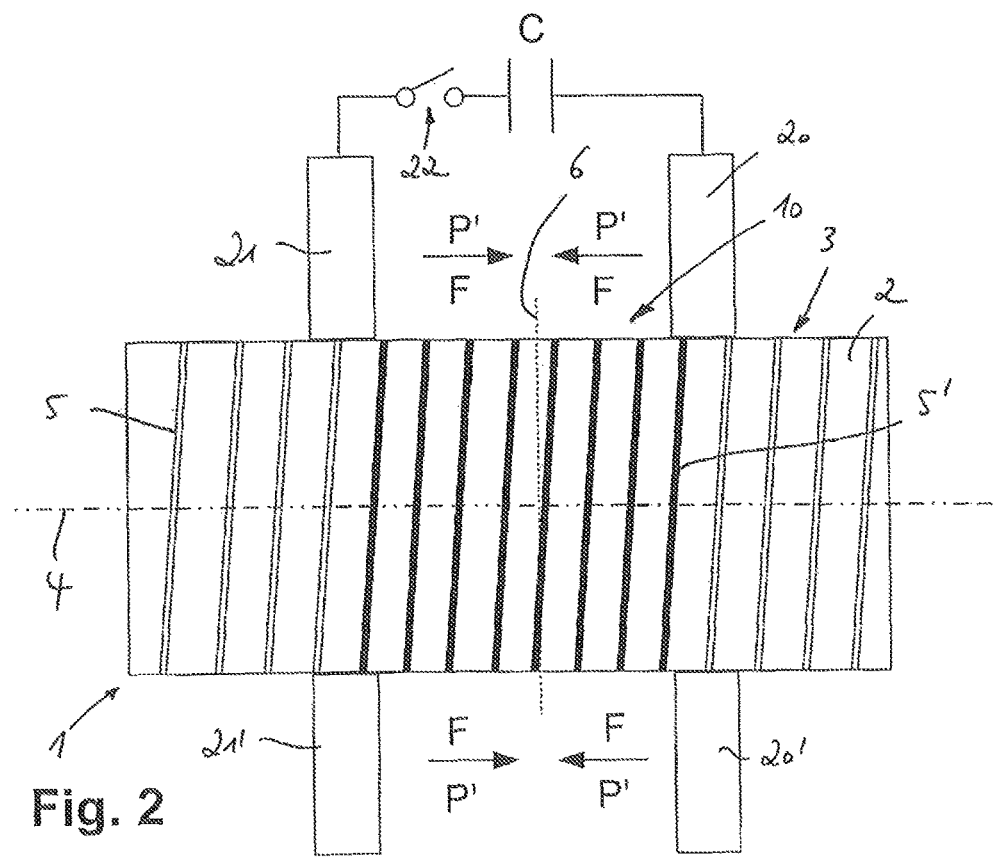
FIG. 2 shows a second cut with the application of the method according to the invention.

FIGS. 1 and 2 show the application of the method according to the invention based on an example of a wound hose 1, with its jacket area 3 being formed by a spiral-shaped wound metallic tape 2. In the following, a winding is understood as a single complete revolution of the metallic tape 2 about the (longitudinal) axis 4 of the wound hose 1. FIG. 1 explicitly marks a number of windings 11, 12, 13, 14. Here, the first winding 11 (virtually) begins at the point 7 and ends at the point 8. The second winding 12 begins at the point 8 and ends at the point 9, etc. The metallic tape 2 and/or the windings define a groove 5, which is variable in its width (here also called joint), which also extends spirally and/or over the jacket area 3 and is symbolized in the figures by parallel lines at the edges of the windings. The connection of the metallic tape 2 at its edges is realized by a relatively loose mutual engagement of the neighboring windings. Since the connection is relatively loosely, the joint 5 is variable in its width over the jacket area 2, as already mentioned.

In order to cut the wound hose 1 to a desired length, according to the invention the wound hose 1 is clamped at both sides of the axial point 6 (cf. FIG. 2), at which the cutting shall occur. Then, the axial area 10 is axially compressed between the points, at which the wound hose 1 is clamped, by impinging it with an axially acting force F "to block" such that in this area 10 a defined mutual contacting occurs of the individual windings 11, 12, 13, 14, resulting in the spirally circumferential joint 5 being constantly minimal in its width and subsequently it can be welded with good quality.

Figure 3:
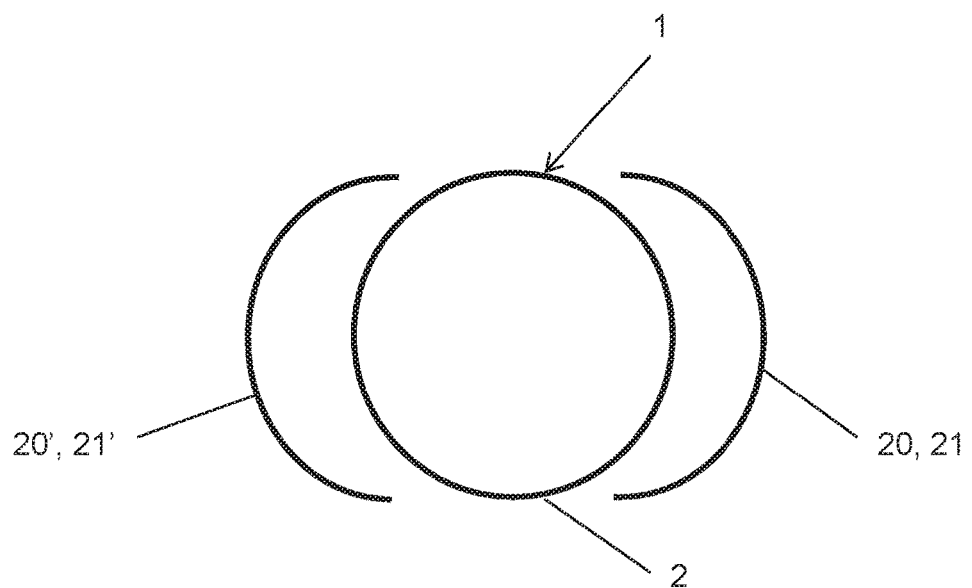
FIG. 3 shows a schematic end view of the wound hose with the electrodes being moved toward the position in which they will come into contact with the jacket area.

Within the scope of the embodiment of the invention shown, the following process occurs for the welding. According to the illustration in FIG. 1 the device used for the welding process of the wound hose 1 comprises two pairs of electrodes 20, 20' and/or 21, 21', with the cooperating electrodes of each pair each being embodied approximately as half circles, as shown in FIG. 3. The electrodes 20, 20' and/or 21, 21' are made to approach each other in pairs in the radial direction in reference to the wound hose 1 until they come into contact with the jacket area 3. This is symbolized by the arrows P in FIG. 1.

Subsequently the electrodes 20, 20' and/or 21, 21' are axially displaced in pairs in reference to each other, which is symbolized by appropriate arrows P' in FIG. 2. When the electrodes 20, 20' and/or 21, 21' contact the wound hose 1 in a force-fitting fashion, this way the wound hose 1 is axially compressed in the above-mentioned area 10, which has already been pointed out.

Subsequently the electrodes 20, 20', 21, 21' are connected via a switch 22, to the capacitor symbolically shown with the reference character C, charged with electric energy, in order to execute the welding process, known per se (capacitor discharge-welding or capacitor pulse welding). Here, the semi-circular electrodes 20, 20' and/or 21, 21' complement each other to form a continuous electrode over the circumference of the wound hose 1 such that in the area 10 between the electrodes 20, 20'; 21, 21' the welding of the windings of the wound hose 1 occurs in the area of the spirally circumferential joint 5.

The actual number of windings of the wound hose 1 being welded depends on the axial distance of the electrodes 20, 20'; 21, 21'. In FIG. 2 the resulting circumferential welding seam is symbolized by a thick, continuous line 5'.

Unlike the illustration according to FIG. 1 and FIG. 2, the scope of the invention includes to provide separately designed devices for the axial compression of the wound hose 1 and for the subsequent introduction of the welding energy, i.e. devices for clamping and compressing the wound hose on the one side and separate devices for introducing the welding energy (particularly electrodes) on the other side.

The invention is however not limited in any way to the application of capacitor discharge welding and/or capacitor pulse welding. For example after the compression of a wound hose 1 in the area 10, similar to FIG. 2, here an impingement with ultrasound energy can occur in the above-mentioned area as well, in order to perform friction welding. Preferably, in this context the above-mentioned separate devices are used for compressing the wound hose, on the one hand, and other devices for impinging the wound hose with ultrasound energy in the compressed area 10, which is not explicitly shown in the figures.

It has proven particularly advantageous and sufficient to weld the joint 5 along two windings 11, 12, and to cut the wound hose 1 in the middle 6 of the two windings 11, 12 (in reference to the axial direction). Then a sufficiently long section 10 develops with a precisely defined and even joint 5, and a clean subsequent cutting is possible without any projecting ends. At both ends of the cutting line securely fixed hose ends remain, which are not unraveling.

Due to the compression of the wound hose 1, which has occurred, a relatively large amount of material is available for welding in the joint 5 in the area 10. This particularly relates to mutually interlocking profiles; the folded profile (agraffe profile) cannot be completely pushed together, due to the given geometry. The above-mentioned effect shows advantageous effects, however.

Finally, the wound hose 1 is cut at the predetermined point in a plane extending radially through the center 6 (thus perpendicular in reference to the jacket area 3 and also perpendicular in reference to the axis 4 of the wound hose 1). The cutting occurs advantageously by a laser, alternatively by a mechanical cutting device.

According to FIGS. 1 and 2 the device according to the invention for cutting a wound hose according to the method described here is embodied as follows: A welder is provided for welding the wound hose in a predetermined axial area along a predetermined number of windings. The welder particularly comprise the electrodes 20, 20' and/or 21, 21', the capacitor C, the switch 22, and/or selective connection means for an electric connection of the capacitor C to the electrodes, as well as appropriate electric charging means for the capacitor C, and furthermore actuators for the electrodes 20, 20'; 21, 21'. These additional means are not explicitly shown in FIGS. 1 and 2.

Further, a cutting device is provided for cutting the wound hose within the predetermined area in a radial plane. This cutting device comprises for example a laser device (not shown). A clamping device is provided for the axial compression of the wound hose in the above-mentioned area, which engage the wound hose and compress it to block such that the individual windings come to contact each other in this area. In the present case, the clamping device coincides with parts of the welding device, i.e. with the electrodes 20, 20' and/or 21, 21'. The invention is however not limited to such an embodiment, as already mentioned repeatedly.

REFERENCE CHARACTERS 1 wound hose
2 metallic tape
3 jacket area
4 axis of the wound hose
5 groove, joint
5' welding seam
6 middle of the area, cutting point, radial plane
7 point (start/end of winding)
8 point (start/end of winding)
9 point (start/end of winding)
10 axial area of the winding hose
11 winding
12 winding
13 winding
14 winding
20 electrode
20' electrode 21 electrode
21' electrode
22 switch
C capacitor
F force
P direction of motion
P' direction of motion

The invention claimed is:

1. A method for cutting a wound hose (1) comprising mutually engaging windings (11, 12, 13, 14) of a metallic tape (2), the method comprising: radially clamping a wound hose (1) on each side of a predetermined axial area (10) by a pair of electrodes, axially compressing together the mutually engaging windings (11, 12, 13, 14) of the wound hose (1) by the pairs of electrodes clamping the wound hose in the predetermined axial area prior to welding, so that in the predetermined axial area (10) a mutually contacting area of windings (11, 12, 13, 14) occurs, welding the wound hose (1) along the mutually contacting area of the windings in the predetermined axial area (10) by the two of the pair of electrodes with the cooperating electrodes of each said pair being embodied to engage about the wound hose, and then cutting the wound hose within said predetermined axial area (10) essentially in a plane (6) extending in a radial direction using a cutting equipment, wherein the welding is performed along a predetermined number of the mutually engaging windings (11, 12, 13, 14), and welding energy required for welding the mutually engaging windings (11-14) is supplied by the predetermined axial area (10) of the wound hose (1) to said predetermined axial area.

2. The method according to claim 1, further comprising performing the welding of the wound hose (1) by capacitor discharge-welding.

3. The method according to claim 2, further comprising each of the two pairs of electrodes being used for the radial clamping of the wound hose and axially applying a compression force to the mutually engaging windings of the wound hose in the predetermined axial area which is located between the two pairs of the electrodes.

4. The method according to claim 3, further comprising using the pairs of electrodes (20, 20'; 21, 21') for further compressing of the wound hose (1) after melting of the metallic tape (2) during welding.

5. The method according to claim 3, wherein the electrodes (20, 20'; 21, 21') are annular.

6. The method according to claim 1, wherein the predetermined number of windings (11-14) is greater than or equal to 2.

7. The method according to claim 6, wherein the laser beam and/or the wound hose (1) are automatically positioned in reference to one another.

8. The method according to claim 7, wherein the automatic positioning is carried out with an optic device.

9. The method according to claim 1, wherein a width of the predetermined axial area (10) is greater than a width of the welding zone.

10. The method according to claim 1, wherein the cutting device utilizes a laser beam or is a mechanical cutter.

11. The method according to claim 10, wherein the cutting device with the laser beam is provided, and the wound hose (1) is moved in reference to the laser beam.

12. The method according to claim 10, wherein the cutting device with the laser beam is provided, and the laser beam is moved in reference to the wound hose (1).

13. The method according to claim 1, wherein the wound hose is clamped at two edges of the predetermined axial area (10) in order for it to be compressed.

\* \* \* \* \*